(12) United States Patent
Oh

(10) Patent No.: US 7,432,984 B2
(45) Date of Patent: Oct. 7, 2008

(54) AUTOMATIC ZOOM APPARATUS AND METHOD FOR PLAYING DYNAMIC IMAGES

(75) Inventor: Keum-yong Oh, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 501 days.

(21) Appl. No.: 10/946,012

(22) Filed: Sep. 22, 2004

(65) Prior Publication Data
US 2005/0151884 A1 Jul. 14, 2005

(30) Foreign Application Priority Data
Jan. 8, 2004 (KR) .................. 10-2004-0001195

(51) Int. Cl.
*H04N 5/232* (2006.01)
(52) U.S. Cl. ........................... 348/578
(58) Field of Classification Search .......... 348/561, 348/578, 239, 511, 240.99, 581
See application file for complete search history.

(56) References Cited

U.S. PATENT DOCUMENTS

| | | | | |
|---|---|---|---|---|
| 5,680,152 A * | 10/1997 | Bricklin | ...................... | 345/419 |
| 5,841,251 A * | 11/1998 | Vroemen et al. | ............. | 348/181 |
| 5,923,365 A * | 7/1999 | Tamir et al. | .................. | 348/169 |
| 6,031,568 A * | 2/2000 | Wakitani | .................... | 348/169 |
| 6,188,432 B1 * | 2/2001 | Ejima | .................... | 348/240.99 |
| 6,211,912 B1 * | 4/2001 | Shahraray | ................ | 348/228.1 |
| 6,507,366 B1 * | 1/2003 | Lee | ............................ | 348/352 |
| 6,924,832 B1 * | 8/2005 | Shiffer et al. | .................. | 348/36 |
| 7,015,976 B1 * | 3/2006 | Orr et al. | .................... | 348/578 |
| 7,130,446 B2 * | 10/2006 | Rui et al. | .................... | 382/103 |
| 2001/0040636 A1 * | 11/2001 | Kato et al. | ............. | 348/333.03 |

FOREIGN PATENT DOCUMENTS

| | | |
|---|---|---|
| JP | 2001-285850 A | 10/2001 |
| KR | 1995-0004815 A | 10/1996 |
| KR | 1998-0029620 A | 7/1998 |
| KR | 1999-0010658 A | 2/1999 |
| KR | 1999-067936 A | 8/1999 |
| KR | 1999-0006984 A | 3/2001 |

* cited by examiner

*Primary Examiner*—Paulos M Natnael
(74) *Attorney, Agent, or Firm*—Sughrue Mion, PLLC

(57) ABSTRACT

An automatic zoom apparatus and method for playing dynamic images. The automatic zoom apparatus provides more dynamic images to a user by detecting a dynamic change of image signals to zoom and display a predetermined area where the dynamic change is detected. To this end, the automatic zoom apparatus for playing the dynamic images comprises a motion detector for, when a zoom function is requested to zoom predetermined image signals, detecting a motion based on a color change between frames extracted from the predetermined image signals. Also included is a motion area designator for designating a predetermined area including objects of the motion detected by the motion detector, as a motion area, and a zoom controller for performing a zoom function for zooming an image of the image signals of the motion area designated by the motion area designator. Thereby, the user can enjoy a more dynamic image such that television watching is not as monotonous.

14 Claims, 6 Drawing Sheets

AUTOMATIC ZOOM APPARATUS AND METHOD FOR PLAYING DYNAMIC IMAGES

CROSS-REFERENCE TO RELATED APPLICATION

This application claims priority of Korean Patent Application No. 10-2004-0001195, filed on Jan. 8, 2004, in the Korean Intellectual Property Office, the content of which is hereby incorporated herein by reference.

BACKGROUND OF THE INVENTION

1. Field of the Invention

Apparatuses and methods consistent with the present invention relate to an automatic zoom apparatus and method for playing dynamic images, particularly in which, when a dynamic zoom function is requested, a predetermined area where motion is detected from received image signals is automatically zoomed and displayed, thereby allowing more dynamic images to be provided to a user.

2. Description of the Related Art

Conventional digital televisions (DTVs) have a zoom function, but this zoom function is restricted in zoom area. For example, Korean Patent Application No. 1999-0006984 (titled "Apparatus for zooming images of digital television") discloses that input images are stored in a line memory unit, and, when zoom area information and zoom magnification are received from a user, a zoomed image is formed from an original image stored in the memory unit by means of a zoom controller, and the zoomed image is provided to the user.

Further, Korean Patent Application No. 1995-0004815 (titled "Local zoom apparatus for television receiver and method for controlling the same") discloses that image signals of predetermined channels are digitally-converted and stored, an image of a particular area is selected by a zoom controller, and the selected image is magnified and displayed as a still or dynamic image on a window.

In this manner, the conventional zoom function is limited to zoom and output a predetermined area from image signals according to a user's selection and it has no diversity. Hence it is difficult to arouse the users' interest in the zoom function.

Further, the conventional zoom function zooms, in a restricted manner, an image in a particular area selected by the user, thus failing to satisfy the user who wishes to enjoy a variety of image effects by means of the digitalized television.

Therefore, there is a demand for an automatic zoom method capable of providing dynamic images by automatically zooming a desired area of the image signals by dynamically changing the image signals.

SUMMARY OF THE INVENTION

Apparatuses and methods consistent with the present invention were conceived, in part, to meet the above-described demand. One aspect of the present invention is to allow more dynamic images to be provided to users by detecting a motion from image signals based on any change in colors between predetermined frames, and zooming and displaying a predetermined area where the motion is detected.

Another aspect of the present invention is to detect at least one motion from image signals received from a tuner by means of a motion detector, to designate a set of predetermined pixels where the motion is detected as a motion area, and to zoom and display the motion area.

Here, the received image signals are stored in a predetermined memory in the unit of a frame. Then, the motion is detected by determining whether or not a color change between frames exceeds a predetermined critical value.

According to one non-limiting, illustrative aspect of the present invention, there is provided an automatic zoom apparatus for playing dynamic images, comprising: a motion detector for, when a zoom function is required for predetermined image signals, detecting a motion based on a color change between frames extracted from the predetermined image signals; a motion area designator for designating a predetermined area including objects of the motion detected by the motion detector as a motion area; and a zoom controller for performing a zoom function for zooming an image of the image signals of the motion area designated by the motion area designator.

Further, it is contemplated that the automatic zoom apparatus may further comprise an output unit for zooming and displaying the image of the image signals of the motion area zoomed by the zoom controller.

According to another non-limiting aspect of the present invention, there is provided an automatic zoom method for playing dynamic images, the method comprising the steps of: when a zoom function is required for predetermined image signals, detecting a motion based on a color change between frames extracted from the image signals; designating a predetermined area including objects of the motion where the motion is detected as a motion area; and zooming and displaying an image of the image signals of the motion area.

Hereinafter, the automatic zoom apparatus and method for playing dynamic images according to the present invention will be described as what is realized to detect at least one motion from the image signals and to automatically zoom a motion area corresponding to the detected motion on DTVs. However, it should be understood to those skilled in the art that this is simply illustrative, and thus various modifications and other equivalent embodiments of a method for detecting a dynamic change of image signals to zoom images of the detected image signals in digital instruments capable of playing images, such as digital still cameras (DSCs), camera phones (having a built-in camera), digital video cameras (DVCs) and so forth are possible.

BRIEF DESCRIPTION OF THE DRAWINGS

The above objectives, features and advantages of the present invention will become more apparent from the following detailed description when taken in conjunction with the accompanying drawings, in which.

DETAILED DESCRIPTION OF ILLUSTRATIVE, NON-LIMITING EMBODIMENTS OF THE INVENTION

Hereinafter, an exemplary automatic zoom apparatus and method for playing dynamic images according to the present invention will be described in detail with reference to the attached drawings.

Figure 1:
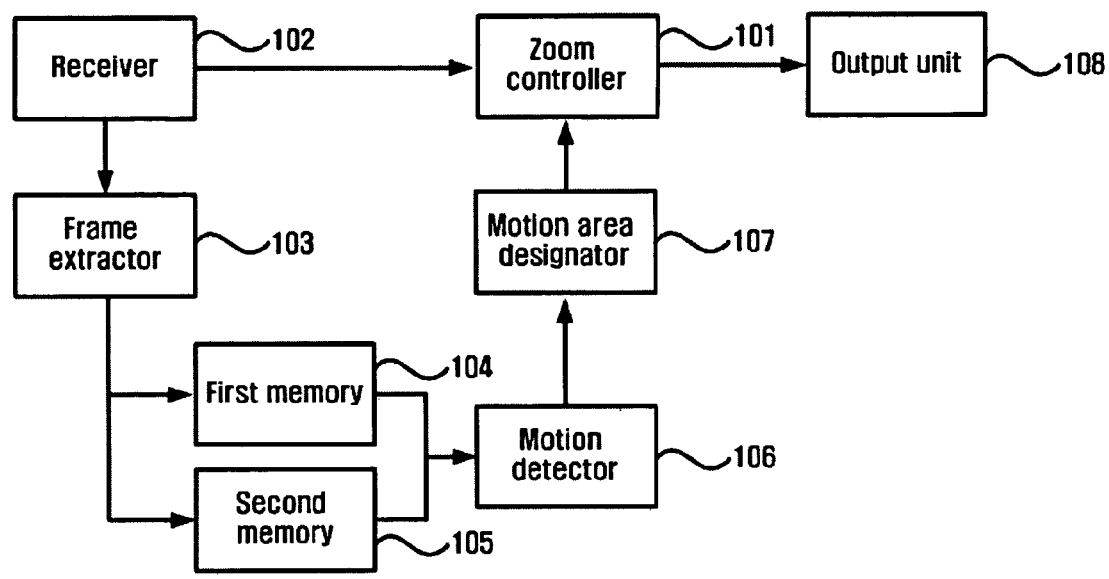
FIG. 1 is a schematic block diagram illustrating a configuration of an automatic zoom apparatus for playing dynamic images in accordance with an exemplary embodiment of the present invention.

FIG. 1 is a schematic block diagram illustrating a configuration of an automatic zoom apparatus for playing dynamic images in accordance with one exemplary embodiment of the present invention.

As shown in FIG. 1, the automatic zoom apparatus for playing the dynamic images comprises a receiver 102, a zoom controller 101, a frame extractor 103, a first memory 104, a second memory 105, a motion detector 106, a motion area designator 107, and an output unit 108.

The receiver 102 receives image signals of various standards, which are inputted through a tuner according to a user's channel tuning.

The zoom controller 101 processes the image signals received from the tuner and provides images of the processed image signals to the user, and performs a zoom function for zooming and displaying image signals of a predetermined motion area designated by the motion area designator 107.

The frame extractor 103 retrieves frame information from the image signals received by the receiver 102 and extracts the image signals in the unit of a frame.

The first memory 104 and the second memory 105 alternately store the image signals extracted in the unit of a frame by the frame extractor 103 at intervals of a predetermined time. To this end, a random access memory (RAM) such as DRAM, SDRAM, SRAM or UtRAM is used.

The motion detector 106 detects a color change between frames of the image signals stored in the first memory 104 and the second memory 105 by means of electrical signals, so as to detect any motion. Here, the motion is detected by determining whether the color change exceeds a predetermined critical value or not. The motion area designator 107 defines a minimum set of pixels from which the motion is detected, according to the result of detecting the motion by the motion detector 106, and designates the defined pixel set as the motion area. In other words, the motion area designator 107 sets the motion area including the set of predetermined pixels where the motion is detected.

The output unit 108 zooms and displays the image from the image signals of the motion area designated by the motion area designator 107 according to a control by the zoom controller 101.

Figure 2:
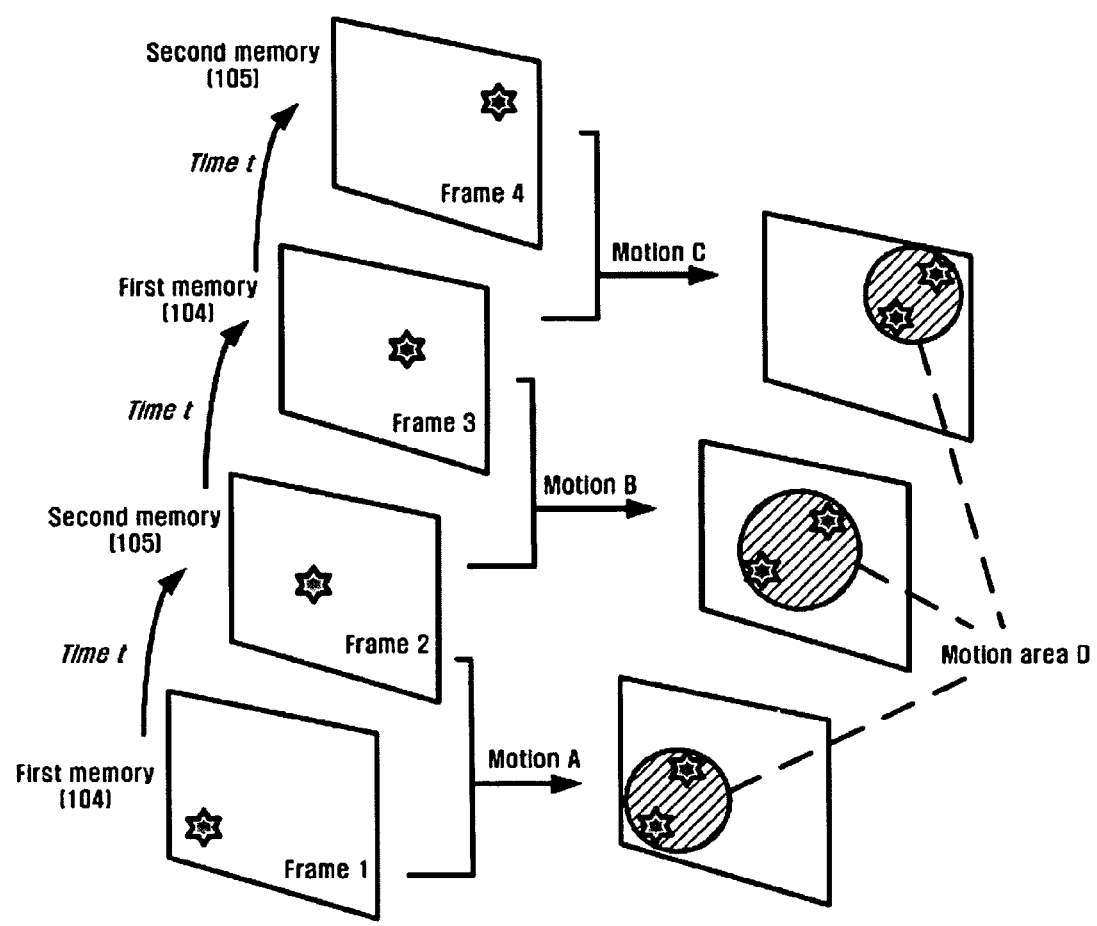
FIG. 2 is a schematic diagram illustrating a process of designating a motion area in accordance with an exemplary embodiment of the present invention.

FIG. 2 is a schematic diagram illustrating a process of designating a motion area in accordance with one exemplary embodiment of the present invention.

As shown in FIG. 2, the motion detector 106 detects any motion from image signals through electrical signals, which are extracted in the unit of a frame by the frame extractor 103 and separately stored in the first memory 104 and the second memory 105.

Specifically, motion A is detected based on a color change between frame 1 stored in the first memory 104 and frame 2 stored in the second memory 105.

This process is repeated with image frames of the image signals stored in the first memory 104 and the second memory 105, and as a result, motion B is detected between frame 2 and frame 3, and motion C is also detected between frame 3 and frame 4. According to the color change between the frames of the image signals, there may exist a plurality of motions.

In this connection, when motions A, B and C are detected based on the color change between the frames, the motion area designator 107 designates the minimum area covering all the motions A, B and C as the motion area.

Figure 3:
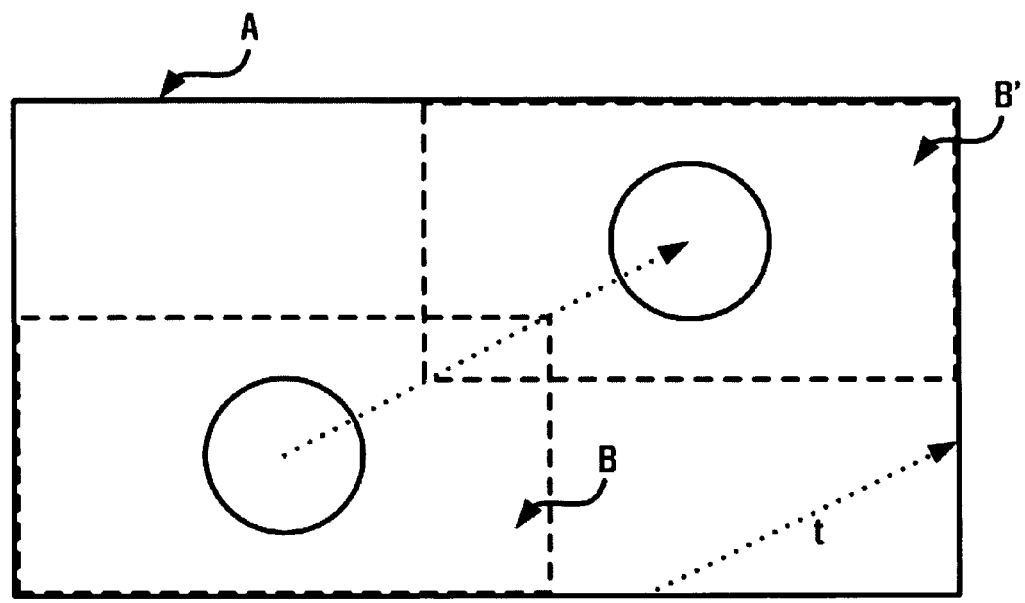
FIG. 3 is a schematic diagram illustrating a process of processing a motion area by a zoom controller in accordance with an exemplary embodiment of the present invention.

FIG. 3 is a schematic diagram illustrating a process of processing a motion area by a zoom controller in accordance with an exemplary embodiment of the present invention.

As shown in FIG. 3, when a motion area B is designated in an original entire picture A by the motion area designator 107, the zoom controller 101 zooms an image of image signals of a pixel area corresponding to the motion area B and displays the zoomed image by the output unit 108 (B, represented by a dotted line in FIG. 3).

Subsequently, the zoom controller 101 zooms the motion area while shifting the motion area along the moving direction of motions for a predetermined time t, and displays the zoomed motion area by the output unit 108 (B', represented by a dotted line in FIG. 3).

For reference, the automatic zoom apparatus for playing the dynamic images according to an exemplary embodiment of the present invention can be formed with modules, all of which may be hardware units, a part of which may be software units, or all of which may be software units.

Therefore, it is apparent that the technical spirit of the present invention may include an automatic zoom apparatus for playing the dynamic images according to one exemplary embodiment of the present invention that is constructed of either hardware or software. And it is also apparent that the automatic zoom apparatus for playing the dynamic images constructed of either hardware or software may be varied and modified without departing from the technical sprit of the present invention.

An automatic zoom method according to the present invention, which makes use of the automatic zoom apparatus for playing the dynamic images constructed as described above, will be described in detail with reference to the accompanying drawings.

Figure 4:
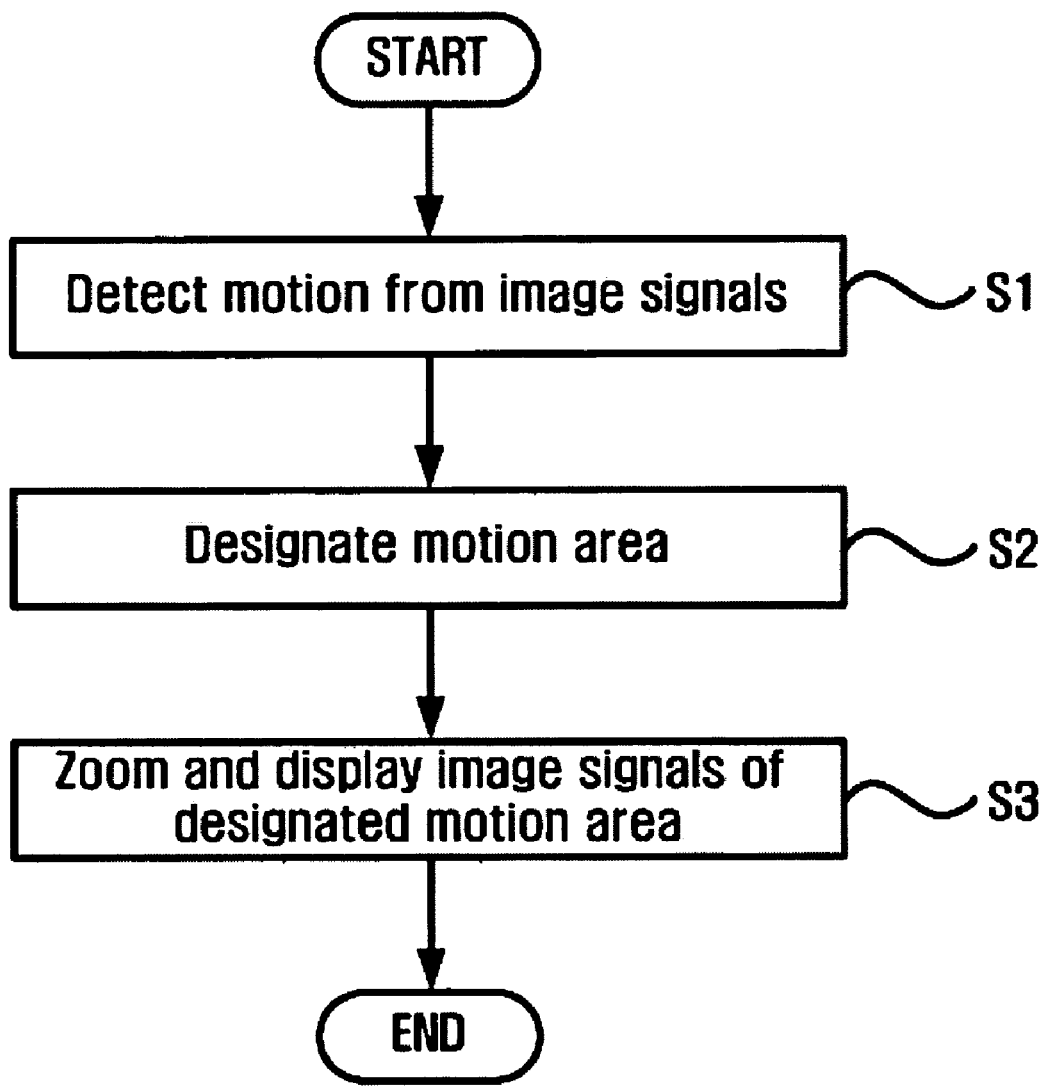
FIG. 4 is a flow chart schematically illustrating an automatic zoom process for playing dynamic images according to an exemplary embodiment of the present invention.

The automatic zoom method for playing the dynamic images according to the present invention, as shown in FIG. 4, generally comprises the steps of detecting at least one motion from image signals (S1), designating a motion area according to the result of detecting the motion (S2), and zooming and displaying an image of the image signals of the designated motion area (S3).

FIGS. 5a to 5d are schematic diagrams illustrating a process of playing dynamic images from image signals in accordance with an exemplary embodiment of the present invention.

When a dynamic zoom function is requested to zoom images which are received by the receiver 102 and provided to the output unit 108, the frame extractor 103 stores frames extracted from the image signals respectively in the first memory 104 and the second memory 105, and the motion detector 106 detects a motion based on a color change between frames stored in the first memory 104 and the second memory 105.

Figure 5A:
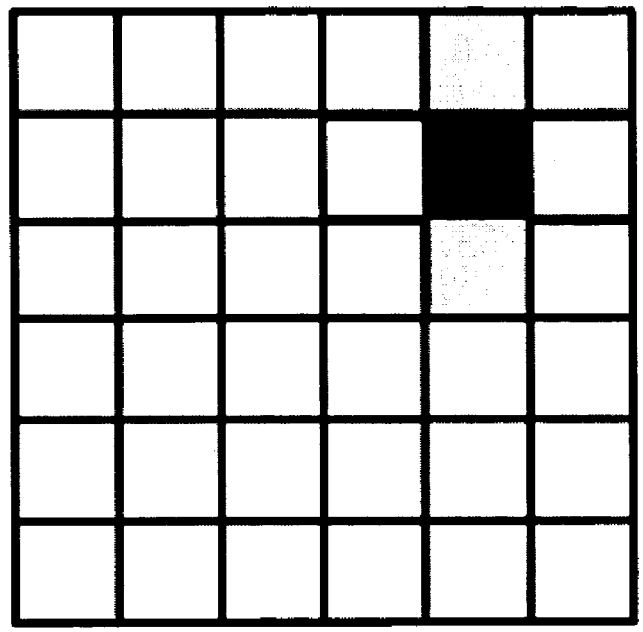
FIGS. 5a to 5d are schematic diagrams illustrating a process of playing dynamic images from image signals in accordance with an exemplary embodiment of the present invention.
Figure 5B:
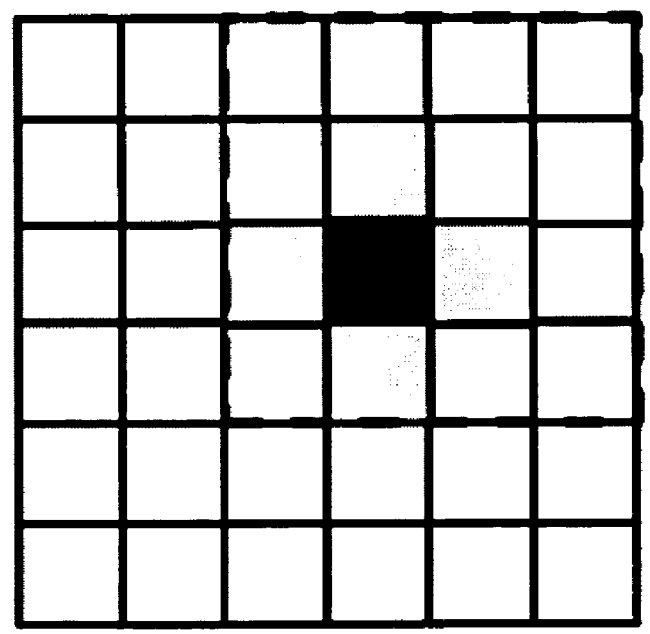

Assuming that image signals consist of a predetermined frame of a 6×6 pixel area, the motion detector 106 detects a motion based on a color change between the frame of FIG. 5a and the frame of FIG. 5b.

Figure 5C:
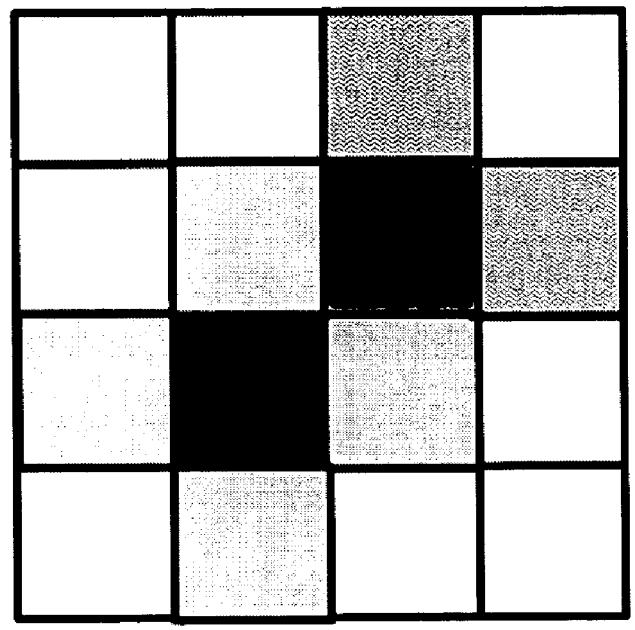

In this manner, if the motion is detected, the motion area designator 107 designates a predetermined area where the motion is detected as a motion area, as shown in FIG. 5c, and transmits information on the designated motion area to the zoom controller 101.

Figure 5D:
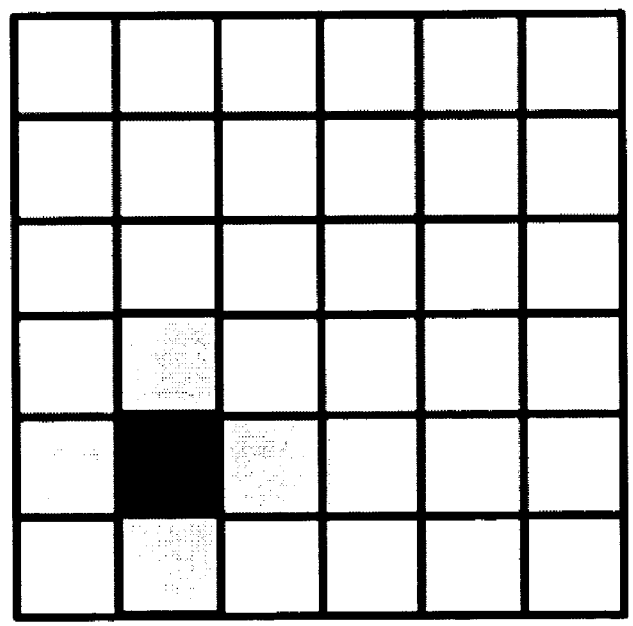

Then the zoom controller 101 zooms and displays an image of the image signals of the pixel area corresponding to the motion area, as shown in FIG. 5*d*.

This zoomed and displayed image continues to be zoomed as the motion area moves, and is displayed to the output unit 108. The zoom controller 101 terminates a dynamic zoom operation for zooming and displaying when no further motion is detected for a predetermined time by the motion detector 106 and the motion area designator 107, and then displays an image of original image signals.

While the present invention has been described in detail in connection with certain exemplary embodiments thereof, the embodiments are simply for the purpose of illustration. It will be understood by those skilled in the art that the present invention may be implemented in a different specific form without changing the technical spirit or essential characteristics thereof. Therefore, it should be understood that simple modifications according to the embodiments of the present invention may belong to the technical spirit of the present invention.

Thus, the genuine scope of the technical protection of the present invention should be defined according to the technical spirit of the attached claims.

According to the present invention, by detecting a dynamic change of image signals and zooming and displaying a predetermined area where the dynamic change is detected, a user can enjoy more dynamic images and television watching would not be monotonous.

What is claimed is:

1. An automatic zoom apparatus for displaying dynamic images, comprising:
    a motion detection which detects a motion based on a color change between frames extracted from predetermined image signals;
    a motion area designator which designates an area including object of the motion detected by the motion detector as a motion area;
    a zoom controller which zooms an image of the image signals of the motion area designated by the motion area designator; and
    an output unit which displays the image of the image signals of the motion area zoomed by the zoom controller,
    wherein the zoomed and displayed image continues to be zoomed by the zoom controller as the motion area moves while the zoomed image is displayed on the output unit.

2. The apparatus as claimed in claim 1, wherein the motion detector detects the motion depending on whether, in the color change between the frames, the color change between predetermined pixels exceeds a critical value.

3. The apparatus as claimed in claim 1, wherein the motion area moves according to a change between frames for a predetermined time.

4. The apparatus as claimed in claim 1, wherein the zoom controller terminates a dynamic zoom operation for zooming and displaying when no motion resulting from the image signals is detected for a predetermined time, and displays an image of original image signals.

5. An automatic zoom method for playing dynamic images, comprising:
    detecting a motion based on a color change between frames extracted from image signals when a zoom function is requested to zoom the image signals;
    designating an area including objects of the motion where the motion is detected, as a motion area; and
    zooming and displaying an image of the image signals of the motion area,
    wherein the zoomed and displayed image continues to be zoomed as the motion area moves.

6. The method as claimed in claim 5, wherein the detecting the motion comprises determining whether, in the color change between the frames, the color change between predetermined pixels exceeds a critical value.

7. The method as claimed in claim 5, wherein the motion area moves according to a change between frames for a predetermined time.

8. The method as claimed in claim 5, wherein the zooming and displaying the image signals of the motion area comprises, when no motion resulting from the image signals is detected for a predetermined time, terminating a dynamic zoom operation for zooming and displaying, and displaying an image of original image signals.

9. An automatic zoom apparatus for playing dynamic images, comprising:
    means for detecting a motion based on a color change between frames extracted from image signals when a zoom function is requested to zoom the image signals;
    means for designating an area including objects of the motion where the motion is detected, as a motion area;
    means for zooming an image of the images signals of the motion area designated by the motion area designator; and
    means for displaying the image of the image signals of the motion area zoomed by the means for zooming,
    wherein the zoomed and displayed image continues to be zoomed by the means for zooming as the motion area moves while the zoomed image is displayed on the means for displaying.

10. The automatic zoom apparatus as claimed in claim 9, wherein the means for detecting determines whether, in the color change between the frames, the color change between predetermined pixels exceeds a critical value.

11. The automatic zoom apparatus as claimed in claim 9, wherein the motion area moves according to a change between frames for a predetermined time.

12. The automatic zoom apparatus as claimed in claim 9, wherein when no motion resulting from the image signals is detected for a predetermined time, a dynamic zoom operation is terminated and an original image signals is displayed.

13. An zoom apparatus for playing images, comprising:
    a motion detector which detects portions of motion in an image signal based on a color change between frames extracted from the image signal;
    a motion area designator which automatically designates an area including the detected portions of the motion of the image signal as a motion area; and
    a zoom controller which zooms the automatically designated motion area of the image signal,
    wherein the zoomed image continues to be zoomed as the motion area moves.

14. An zoom method for playing images, comprising:
    detecting portions of motion in an image signal based on a color change between frames extracted from the image signal;
    automatically designating an area including the detected portions of the motion of the image signal as a motion area; and
    zooming and displaying the automatically designated motion area of the image signal,
    wherein the zoomed and displayed image continues to be zoomed as the motion area moves.

* * * * *